United States Patent [19]

Parkinson

[11] Patent Number: 4,663,975
[45] Date of Patent: May 12, 1987

[54] VIBRATORY WIRE STRAIN GAUGE ASSEMBLIES FOR UNDERWATER ATTACHMENT

[75] Inventor: Neil Parkinson, Newcastle-upon-Tyne, England

[73] Assignee: British Gas Corporation, London, England

[21] Appl. No.: 701,520

[22] Filed: Feb. 14, 1985

[30] Foreign Application Priority Data

Mar. 2, 1984 [GB] United Kingdom ............... 8405475

[51] Int. Cl.⁴ .............................................. G01N 3/08
[52] U.S. Cl. ................................. 73/778; 73/862.59
[58] Field of Search .................. 73/778, DIG. 1, 787, 73/775, 786, 862.59

[56] References Cited

U.S. PATENT DOCUMENTS 3,683,684 8/1972 Judlowe ........................... 73/778 X
4,074,565 2/1978 Harris et al. ........................ 73/778

*Primary Examiner*—Jerry W. Myracle
*Attorney, Agent, or Firm*—Oblon, Fisher, Spivak, McClelland & Maier

[57] ABSTRACT

A system comprises a pair of straps which are preferably hinged and are arranged to be clamped around a structure, for example, a tubular member to be strain gauged, and secured, for example, by a single swing bolt with a diver sized hand knob. Across these two straps are a number of, for example, two sets of four equally spaced arranged strain gauge assemblies, aligned along the longitudinal axis of the tubular member. Vibrating wire strain gauges are uniformly suspended by compression springs from a protective cover. Because such compression springs are relatively free to move laterally by small amounts, they do not significantly increase the axial stiffness of the strain gauge. The protective cover is attached to the two clamping straps by set bolts with diver sized hand knobs. When tightened the strain gauge will be pressed onto the member surface with the pre-determined spring force. The protective cover is skirted by sealing, which, after installation will seal around the gauges offering complete mechanical protection plus protection from marine fouling.

4 Claims, 4 Drawing Figures

VIBRATORY WIRE STRAIN GAUGE ASSEMBLIES FOR UNDERWATER ATTACHMENT

This invention relates to strain measuring instrumentation and, more particularly, to instruments capable of determining nominal axial and bending strain histories in underwater tubular members as well as other structures, which instruments can be attached underwater to existing structures.

At present no systems are commercially available although strain information is desirable for a number of purposes, e.g.

(1) Design Verification
(2) Damage Assessment
(3) Fatigue Life Predictions
(4) Evaluation of Structural Modifications or Repairs
(5) Quantifying Environmental Loadings
(6) Monitoring Changes in Topside Mass, Marine Growth, Load Path, etc.
(7) Re-Certification Justification.

Measurement of strain information can be achieved by a number of methods. The most widely used type of strain sensor is the electrical resistance (or foil) strain gauge. These are generally accepted as being extremely accurate, simple to install and relatively cheap. However, there are a number of disadvantages. For example, these gauges tend to be unstable over long periods of time and are very sensitive to surface anomolies and environmental changes. The lack of robustness and general longevity in service detract from their usefulness in hostile environmental conditions. A second type of strain sensor is the vibrating wire (VW) strain gauge.

The VW strain gauge consists of a thin, high tensile steel wire tensioned between two anchor blocks rigidly attached to the test object. The wire is excited by an electromagnetic impulse causing it to vibrate at its natural frequency. Strains in the test object will alter the distance between the two anchor blocks causing a change in the wire tension and thus a change in the natural frequency of the vibrating wire. The frequency of the vibrating wire is monitored by an electromagnetic pick up and, by using a feedback circuit, the wire can be continuously excited at its natural frequency thus giving a dynamic frequency output. The strain in the wire is proportional to the square of its natural frequency and is given by the simple expression:

$$e = K(f^2)$$

where
e is the strain in the wire
f is the natural frequency of the wire and
k is a constant known as the Gauge factor.

The VW strain gauge possesses inherent features which confer a number of advantages over the electrical resistance strain gauge.

(i) Gauges are more robust
(ii) Gauges are very stable over long periods of time
(iii) Gauges are less sensitive to the surface finish of the test member
(iv) Gauges are less sensitive to temperature changes
(v) Gauges measure nominal axial strains, not hot spot strains
(vi) Gauges are less sensitive to impedance of cable
(vii) Gauges can be waterproofed and protected before installation
(viii) Gauges can be attached by a number of methods.

However, the problem of fixing the anchor blocks to the substrate exists, especially where the gauges have to be positioned in hostile environments such as on undersea structures, using non specialist divers. Setting up the instrument is also a problem since conventional laboratory-type dry installation procedures are much too difficult to be performed underwater by a diver.

The invention seeks to provide an assembly for determining strain histories in structures which can be readily affixed to the structure under test and which requires little, if any, adjustment when so affixed.

Accordingly, the present invention provides an assembly for the determination of strain histories in a structure including:

(1) a pair of straps, arranged in parallel and adapted, in use, to be clamped around a structure;
(2) a plurality of carrier bodies located so as to bridge the straps and moveably mounted thereon so that each carrier body is independently moveable in a direction normal with respect to the straps and the structure, each carrier body being arranged to carry at least one resiliently mounted strain gauge comprising a high tensile wire pre-tensioned between two spaced-apart anchor blocks, means for bonding the anchor blocks to the surface of the structure in the region between the straps, means for exciting the wire to cause it to vibrate and transducer means responsive to changes in the frequency of the vibrating wire; and
(3) means for measuring the transducer output.

The transducer output may be measured using proprietory instruments such as the GT 1189 Meter supplied by Gage Technique Ltd.

Preferably, the carrier bodies are moveable by only a predetermined amount in one direction normal to the strap and structure in order to bring the bonding means, for example, a pad of adhesive into bonding contact with the structure substrate or surface.

The invention will be further described with reference to the accompanying drawings in which.

Figure 1:
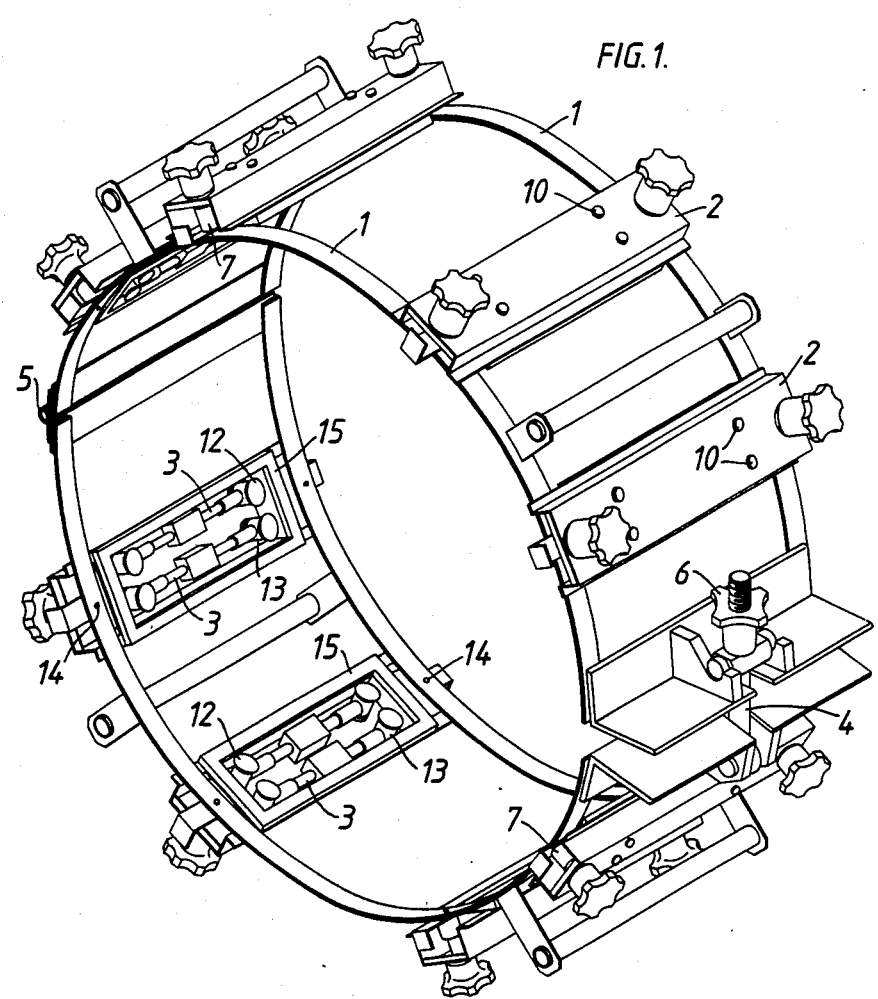
FIG. 1 is a general view of an assembly according to the invention.

Referring to the drawings, the assembly shown in FIG. 1 is constructed to be attached to a tubular structure 9 (not shown in FIG. 1) such as a cross-member in the leg of an oil or gas off-shore production rig. The assembly consists of two hinged circumferential straps 1, across which are suspended a number (eight in this embodiment), of carrier bodies 2. Mounted within each carrier body is a pair of VW strain gauges 3. Satisfactory results can be obtained using one gauge per body.

To assist in manoeverability the assembly may be provided with buoancy aids. The assembly is lowered down to the divers.

Where the strain information is to be relayed to the surface via a cable, the cable may be suitably strengthened or reinforced and armoured for it to be used for lowering the assembly.

The structure to be tested is first cleaned in the area where the assembly is to be fitted, for example a member may be grit blasted using a conventional grit entrainment water blasting technique. The assembly is affixed to the structure by unscrewing the toggle catch 4 and opening the two hinged sections about the hinge point 5, arranging the assembly around the structure and closing the hinged portions. The assembly is secured to the structure by re-clamping the toggle catch and tightening nut 6. Preferably nut 6 is sized suitably for it to be grasped and operated by the gloved hand of a diver.

Attached to the strap 1 is a body 7 which is a bored and internally screw threaded to form a captive nut adapted to receive a co-operating screw threaded set screw 8 associated with body 2. Although the set-screw 8 is free to rotate within a journal (not shown) in body 2, it is held captive at its upper end. Thus co-operating engagement between the set screw 8 and nut 7 will determine the vertical position of the carrier body with respect to the surface of the structure 9.

Figure 2:
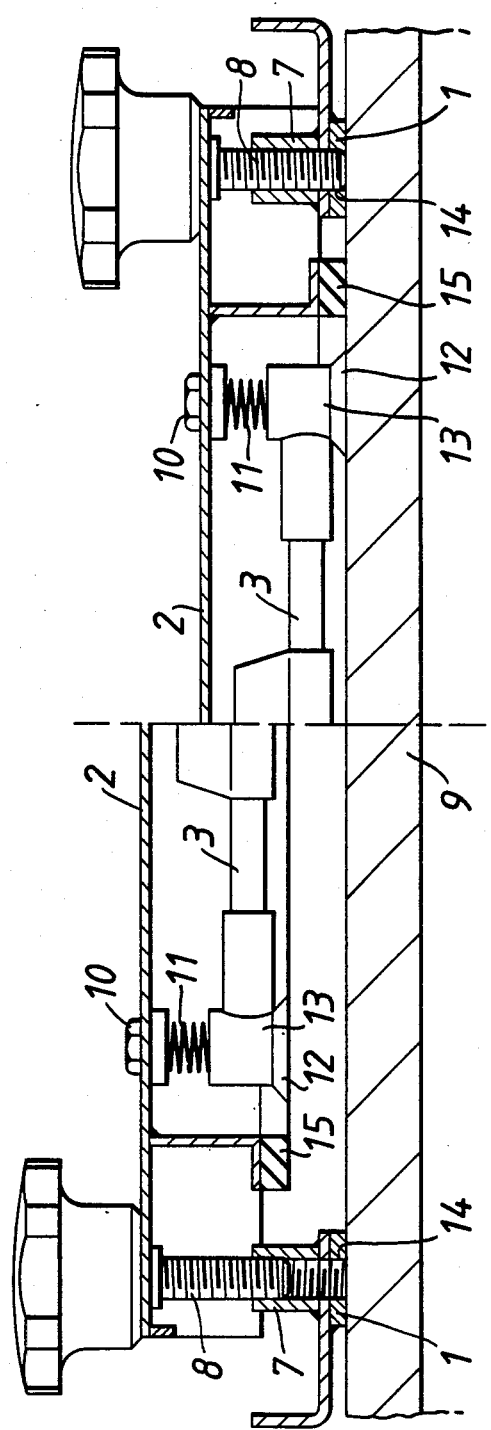
FIG. 2 is a sectional view in two parts illustrating one of the carrier bodies bearing a strain gauge: (a) in the non-bonded condition, and (b) in bonding contact with the surface of a structure.
Figure 3:
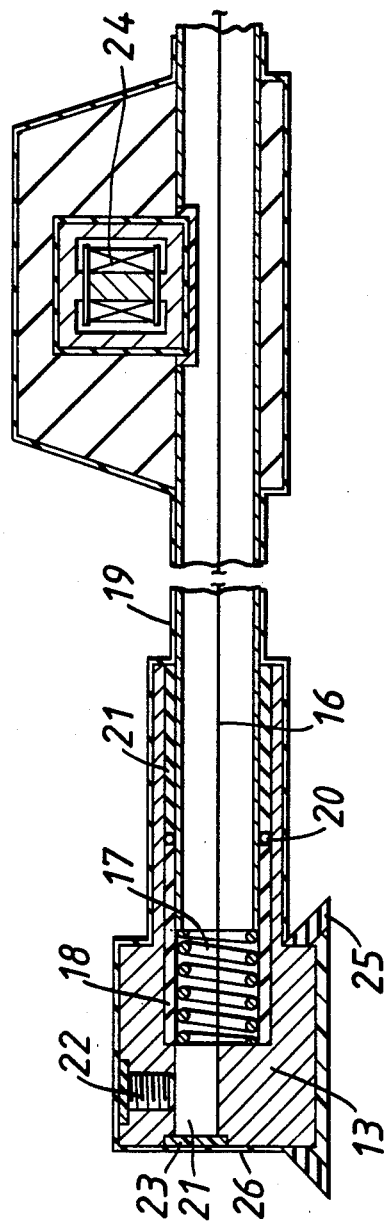
FIG. 3 is a sectional view through a VW strain gauge switch for use with the assembly of the invention.

Suspended from each carrier body are a pair of VW strain gauges 3. These are gauges aligned with the main or longitudinal axis of the structure under test and resiliently mounted from the top portion of the carrier body by compression springs 11. On screwing in set screw 8 from the position shown in FIG. 2(a), the carrier body is urged towards the structure surface until the adhesive block 12 on the foot of the anchor block 13 contacts the substrate 9. The action of spring 11 biases the VW gauge towards the surface to ensure that the adhesive is in contact with the surface whilst bonding is occuring. However, the actual loading of the spring is governed by the distance moved by the set screw. As will be seen in FIG. 2(b) when the end of the screw sets on the surface no further movement is possible. To ensure that accurate setting is achieved holes are drilled in the strapping are drilled at 14, through which the set-screw passes. Thus the pre-setting of the VW gauge does depend on any disconformity in the straps. In order that this pre-setting can be readily achieved even under hostile environmental conditions, the set-screws are provided with knobs of sufficient size to be handled by divers. When pre-setting is performed the bottom of the carrier body is in a sealing contact with the surface by the sealing gasket 15 which may be made of rubber. Thus the pre-set strain gauges are protected from the outside environment.

The strain gauge 3 is a pre-tensioned, sealed strain gauge whereby the vibrating wire 16 is pre-set to the required datum frequency, only requiring the diver to attach the anchor blocks 13 to the surface of the test object.

The pre-tensioning is achieved by the use of two internal compression springs. These two springs are located by nylon sleeves 18 in the gauge end mounting blocks between the end mounting blocks and the gauge tube 19. During gauge assembly, the vibrating wire is tensioned against the two springs until the correct wire frequency is obtained and then the wire is securely clamped in the end blocks. The springs and gauge tube are designed such that when the wire is at the correct datum frequency (e.g. 950 Hz), the gauge length will also be correct (e.g. 140 mm).

Because the compression spring (11) rate is much less than the modulus of the vibrating wire, then the inclusion of these springs does not significantly affect the axial stiffness of the gauge, that is, the axial load required to be applied at the end mounting blocks to produce a unit strain in the gauge.

The gauge is sealed by a combination of both 'O' rings 20 and bonded cast elastomer seals 21.

The 'O' rings serve three main purposes:
(1) they centralise the gauge tube in the end mounting blocks very accurately;
(2) they prevent the cast elastomer seal from entering the gauge during manufacture; and
(3) they will act as conventional 'O' ring seals should water get past the bonded elastomer seal.

Normally when 'O' rings are used as seals, only a small radial clearance is usual between the 'piston and cylinder' and the 'O' ring itself is located in a groove. The strain gauge according to this invention, however, uses a very unconventional 'O' ring configuration, allowing a relatively large radical clearance and locating the 'O' ring between the nylon sleeve and the cured elastomer seal. This large radial clearance is important to enable the cast elastomer seal to have a low axial stiffness for a relatively large bond area. It also prevents the end mounting blocks from 'pinching' the gauge tube if misaligned slightly, for example due to mounting on a very uneven surface.

The ends of the vibrating wire, clamp pins 21 and set screws 22 are recessed into the end mounting blocks and are sealed by filling the recesses with resin 23, e.g. a water resistant epoxy resin.

The electromagnetic coil 24 and electrical cable (not shown) are attached to the gauge tube and waterproofed using the technique known as "potting". This method is commonly used for electrical components and sub-sea connections where very good mechanical strength and waterproofing properties are required.

The material used for both the cast elastomer seals between the gauge tube and the end mounting blocks and also for potting the electrical connections may be a two part heat curing polyurethane compound, for example that designated ES700, manufactured by the Baxendon Chemical Company Ltd., Lancashire.

After assembly, the complete gauge is coated with, for example, at least five coats of a corrosion inhibiting synthetic rubber compound 26 exhibiting the desirable adhesive and waterproofing properties. A coating designated PR1005CH and manufactured by Berger PRC division, Newcastle, has been found to be suitable. The two gauge end mounting blocks 13 may be skirted by rubber boots 25 with sliding plastic covers (not shown). These boots serve three main purposes:
(1) they contain the adhesive 12 during installation;
(2) they form a favorable epoxy fillet profile after installation to reduce the possibility of crevice corrosion attack of the bond line; and
(3) the sliding covers reduce the possibility of dirt or other foreign bodies such as marine fouling contaminating the adhesive bond.

The two rubber boots are filled with the adhesive above water, for example, through a small hole in each of the sliding covers using a special dispenser which is a pneumatic device consisting of a co-axial cartridge containing the two air free parts of the epoxy adhesive. When activated, a co-axial piston forces the two parts through a disposable mixing nozzle where they are blended together in the correct proportions to produce a very consistent air free resin.

The preferred adhesive 12 is an underwater adhesive, for example, special two part epoxy adhesive containing a water displacing agent. An adhesive, designated Silverlock 1902 (or 1901) and supplied by BTR Industries Ltd of Burton-on-Trent, has been preferably used. If non-thixotropic adhesives are used, it is preferred seal of the open ends of the boot with the removable cover, for example, the slide mounted cover, which is removed just prior to setting of the strain gauge on to the structure surface.

The strain histories from the vibrating wire strain gauges will first be reduced to just the three histories of the nominal axial strain, the maximum bending strain and the angle between the axis of bending to some datum direction.

Figure 4:
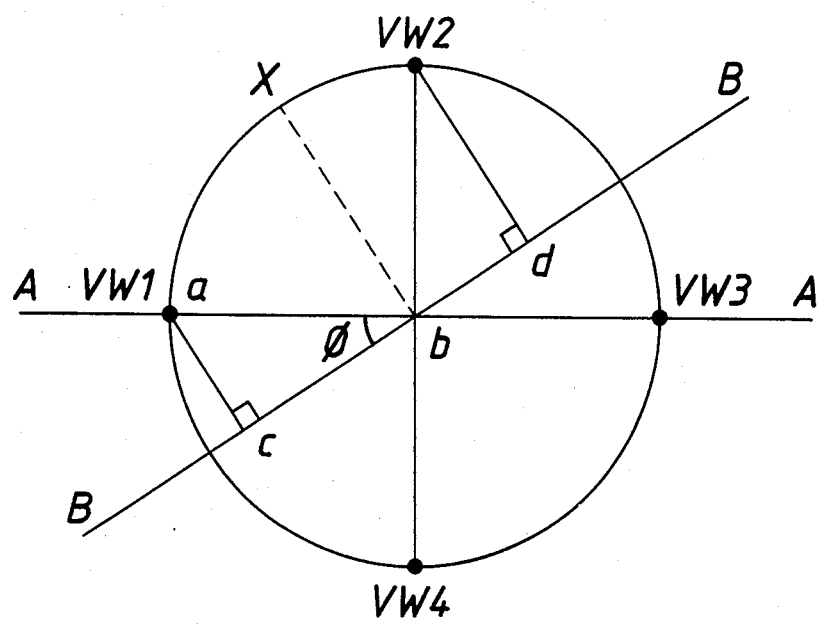
FIG. 4 is an analysis diagram for strain data.

Thus from the eight gauges illustrated in the embodiment, these parameters can be calculated from the minimum of any three of either set of four equally spaced gauges as follows and with reference to FIG. 4.

This redundancy allows for individual gauge failure and enables the results to be cross-checked and averaged.

Consider three of the four vibrating wire strain gauges $VW_1$, $VW_2$ and $VW_3$.

At any instant in time, let the total strain outputs from these be $P_1$, $P_2$ and $P_3$. (Where $P=$"Rho")

These total strains consist of bending strain components $P_{1B}$, $P_{2B}$ and $P_{3B}$ and an axial strain comonent $P_A$, assumed to be uniform at any position around the tubular member.

Assume that bending occurs across some diameter BB at an angle $\phi$ to the datum diameter AA. Because $VW_1$ is opposite $VW_3$, then $P_{1B}=P_{3B}$ and the axial strain $$P_A = \frac{P_1 + P_3}{2}.$$

The bending strains are then given by:

$P_{1B}=P_1-P_A$, $P_{2B}=P_2-P_A$ etc.

Because bending strains are proportional to distance from the neutral axis BB, then $$\frac{P_{1B}}{P_{2B}} = \frac{ac}{fd}$$

But as $VW_1$ is 90° from $VW_2$, then triangles abc and fdb are similar and so fd=cb.

Therefore $$\frac{P_{1B}}{P_{2B}} = \tan \phi \text{ or } \phi = \tan^{-1} \frac{P_{1b}}{P_{2B}}$$

The position of maximum bending strain occurs at the position furthest from the neutral axis BB, at position X.

The bending strain at $$X = P_{XB} = \frac{P_{2B}}{\cos \phi}$$

and the total strain at $X=P_X=P_{XB}+P_A$.

In this way, at any instant in time, the 8 vibrating wire strain outputs can be reduced to just the three parameters, axial strain, maximum bending strain and the angle between the axis of bending to some datum.

From these three parameters, the total strain histories can be resolved at any point around the circumference of the tubular member (for example at 16 equally spaced points), and the total strain cycles at each point counted and thus the fatigue damage estimated using an appropriate S/N curve.

Strain information obtained for the gauges may be transmitted to the surface as an electric signal by means of a cable. However, alternative data transmission systems may be employed such as accoustic telemetry.

I claim:

1. An assembly for the determination of strain histories in a structure, including:
   (i) a pair of straps, arranged in parallel and adapted, in use, to be clamped around a structure;
   (ii) a plurality of carrier bodies located so as to bridge the straps and moveably mounted thereon so that each carrier body is independently moveable in a direction normal with respect to the straps and structure, each carrier body being arranged to carry at least one resiliently mounted strain gauge comprising a high tensile wire pre-tensioned between two spaced apart blocks, means for bonding the blocks to the surface of the structure in the region between the straps, means for exciting the wire to cause it to vibrate and transducer means responsive to changes in the frequency of the vibrating wire; and
   (iii) means for measuring the transducer output.

2. An assembly as claimed in claim 1 wherein said carrier body is mounted on the straps by means of a set-screw held captive to the body, co-operating and engaged with a nut fixed to the strap.

3. An assembly as claimed in claim 1 or claim 2 in which the straps are hinged.

4. An assembly as claimed in claims 1 or 2 wherein the bonding means is an epoxy adhesive.

* * * * *